United States Patent [19]

Gergely

[11] Patent Number: 5,061,846
[45] Date of Patent: Oct. 29, 1991

[54] DETECTING DISTURBANCE USING OPTICAL GAP SENSING

[75] Inventor: John S. Gergely, Ponca City, Okla.

[73] Assignee: Conoco Inc., Ponca City, Okla.

[21] Appl. No.: 351,743

[22] Filed: May 11, 1989

[51] Int. Cl.$^5$ .............................................. H01J 5/16
[52] U.S. Cl. ................................ 250/227.14; 250/225; 250/231.19
[58] Field of Search ............. 250/225, 226, 227, 231 P, 250/227.14, 231.19; 73/655, 705; 367/141, 149, 169; 350/96.15, 96.18, 96.29

[56] References Cited

U.S. PATENT DOCUMENTS

| | | | |
|---|---|---|---|
| 2,341,422 | 2/1944 | Bubb | 88/14 |
| 4,254,331 | 3/1981 | Dorman et al. | 250/227 |
| 4,321,831 | 3/1982 | Tomlinson et al. | 73/705 |
| 4,368,645 | 1/1983 | Glenn et al. | 73/705 |
| 4,442,350 | 4/1984 | Rashleigh | 250/227 |
| 4,487,206 | 12/1984 | Aagard | 128/667 |
| 4,509,370 | 4/1985 | Hirschfeld | 73/705 |
| 4,518,857 | 5/1985 | McMahon et al. | 250/225 |
| 4,523,092 | 6/1985 | Nelson | 250/227 |
| 4,543,831 | 10/1985 | Meyer | 250/231 P |
| 4,556,791 | 12/1985 | Spillman, Jr. | 250/225 |
| 4,593,191 | 6/1986 | Alles | 250/227 |
| 4,599,711 | 7/1986 | Cuomo | 367/141 |
| 4,599,901 | 7/1986 | Hirschfeld | 73/705 |
| 4,599,908 | 7/1986 | Sheridan et al. | 73/862.04 |
| 4,626,680 | 12/1986 | Martens et al. | 250/231 |
| 4,713,538 | 12/1987 | Theocharous | 250/227 |
| 4,786,802 | 11/1988 | Yoshii et al. | 250/225 |

Primary Examiner—David C. Nelms
Assistant Examiner—S. Allen

[57] ABSTRACT

Apparatus for detecting minute disturbance such as seismic vibrations or the like which utilizes an optically clear gap material as the primary sensing element. The gap material is subjected to the disturbance and any reactive change in width or index is sensed optically by monitoring the light transmission properties of the gap material. A particular type of sensor is disclosed consisting of a length of optic fiber having the tip end covered by the gap material with the distal surface bearing a reflective coating.

14 Claims, 4 Drawing Sheets

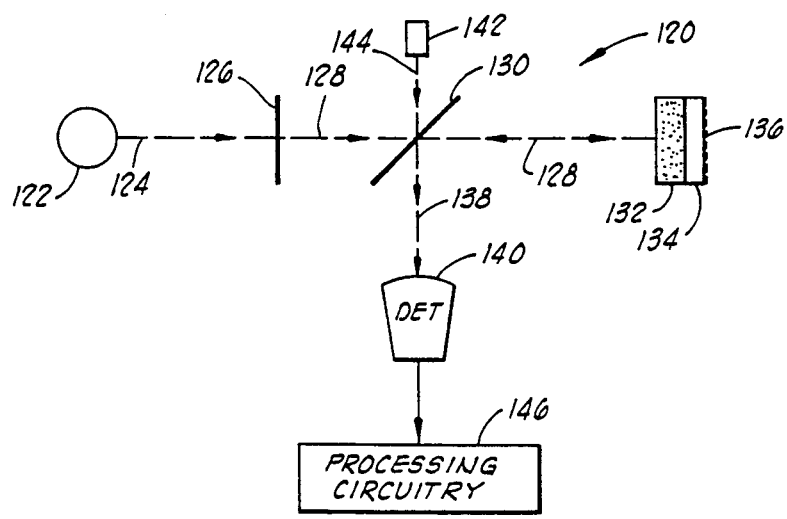
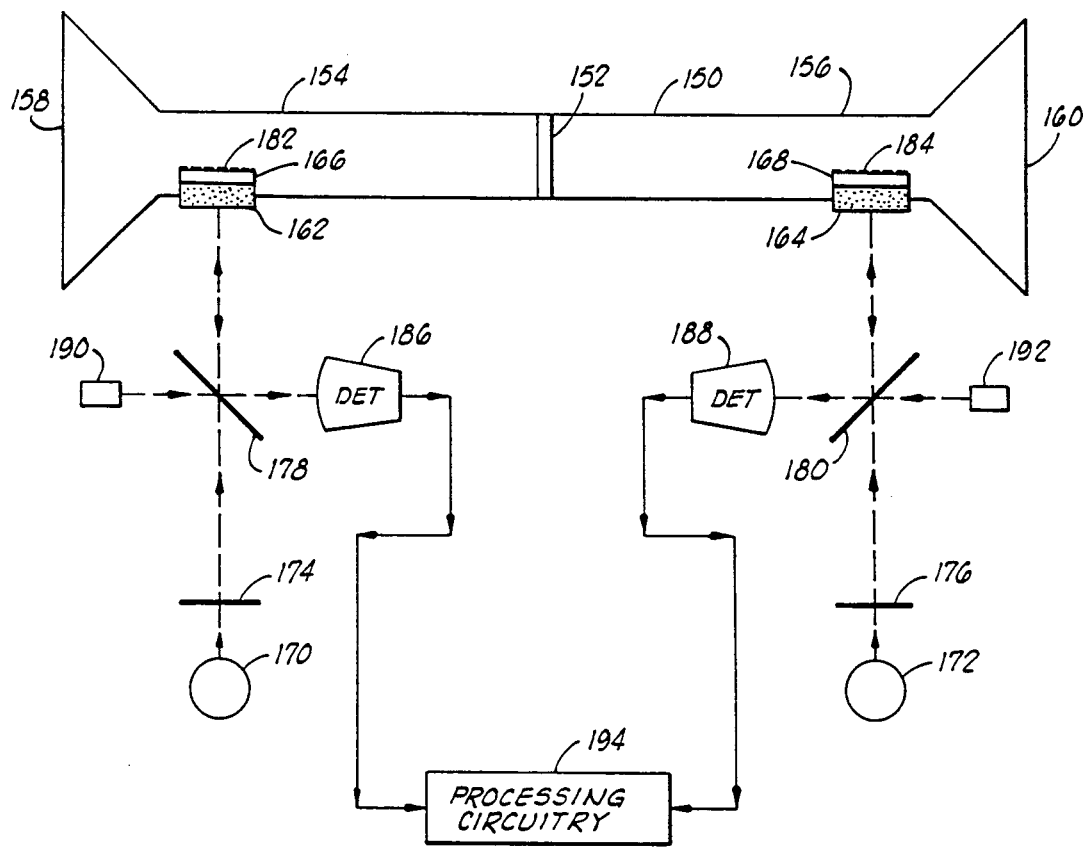

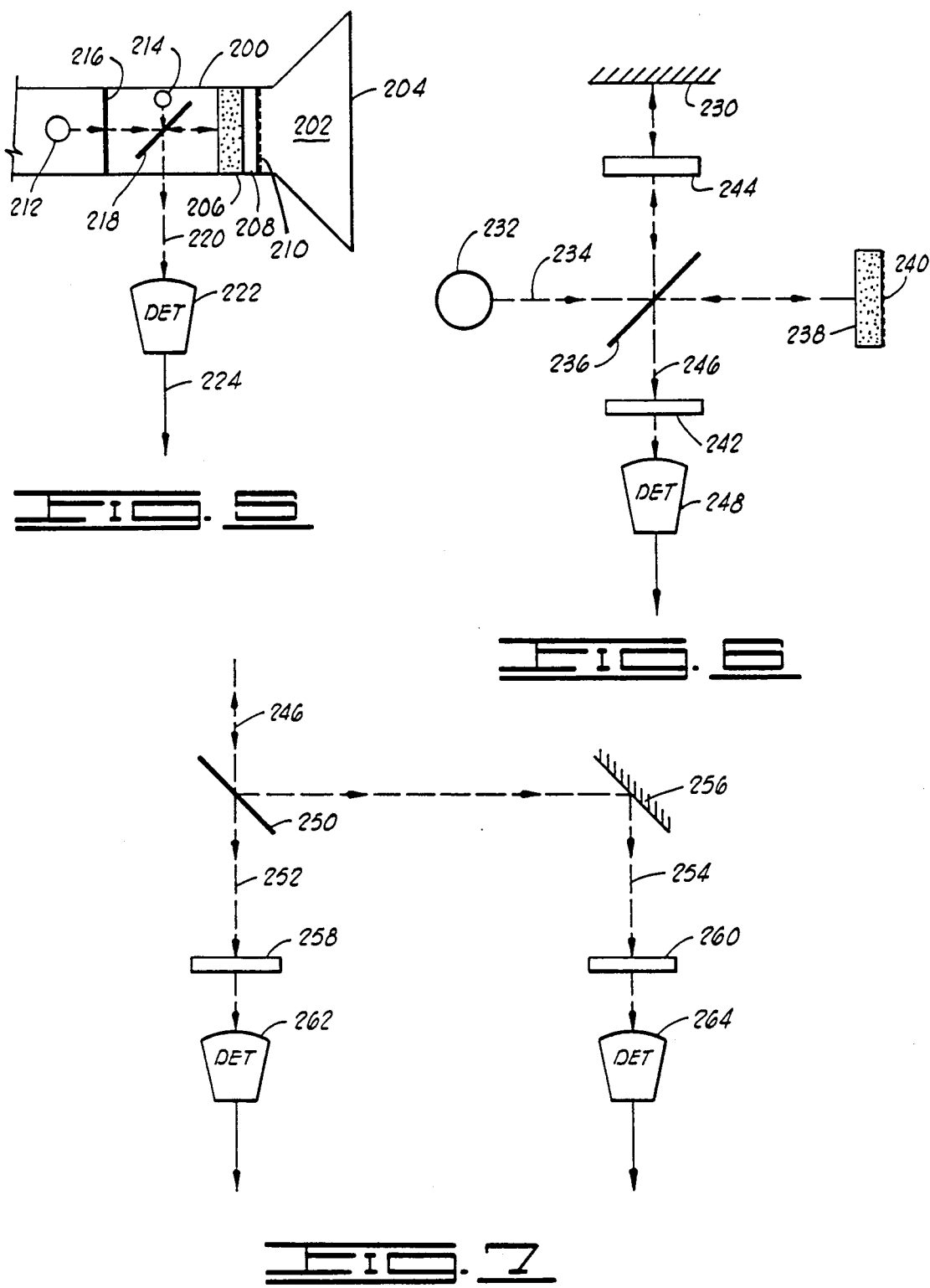

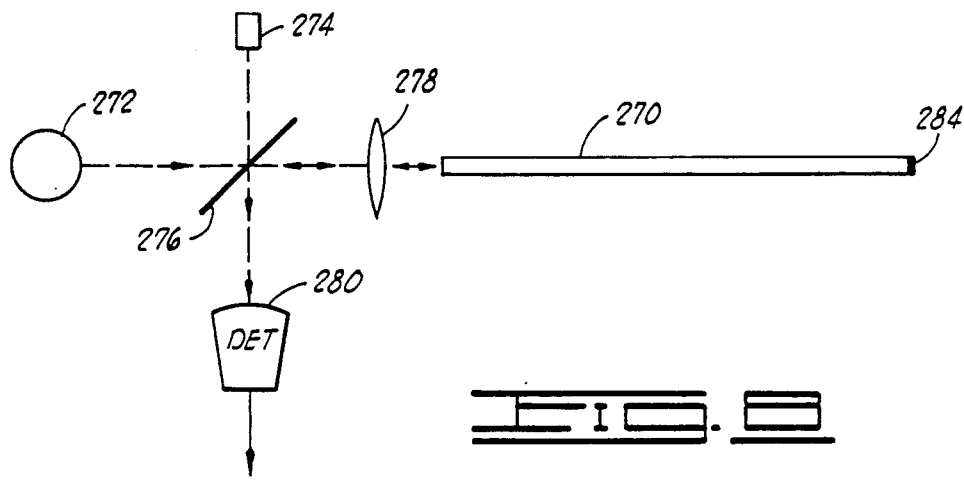
FIG. 8
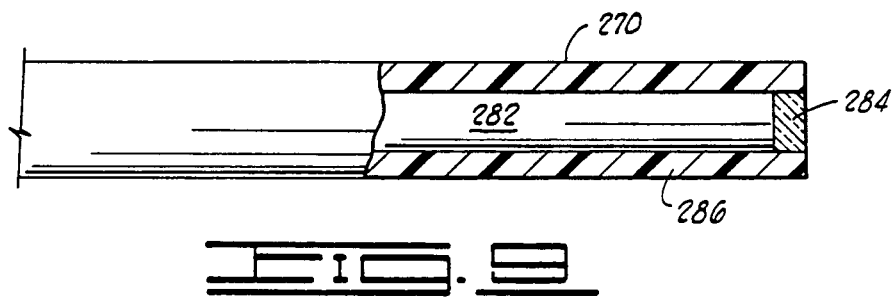
FIG. 9
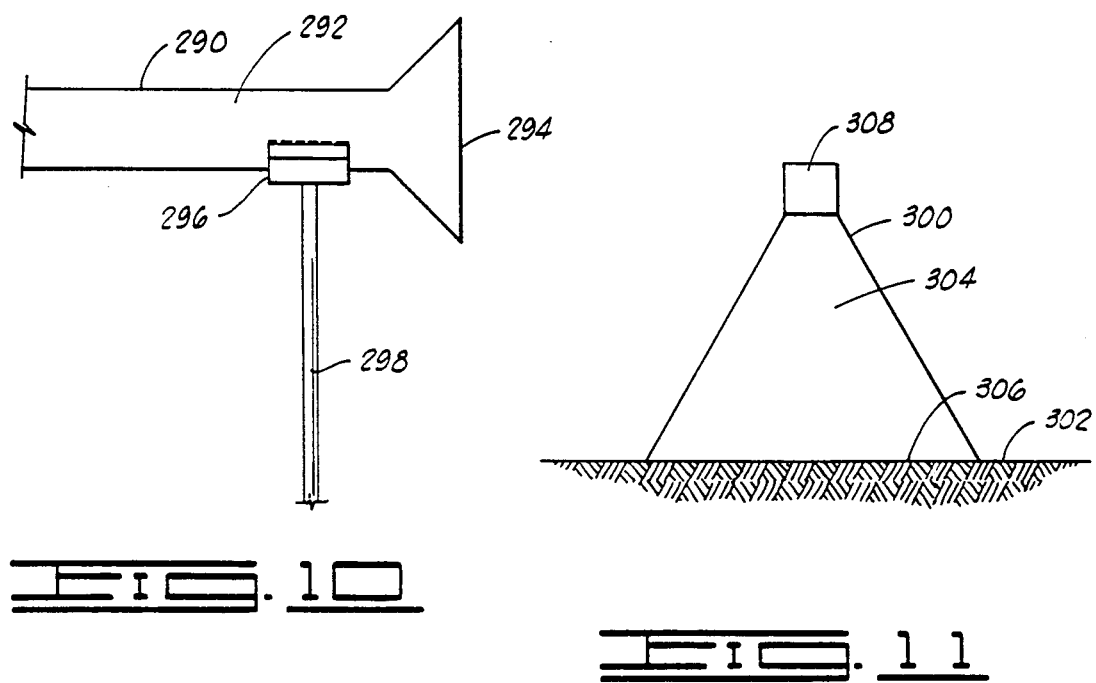
FIG. 10
FIG. 11

DETECTING DISTURBANCE USING OPTICAL GAP SENSING

CROSS-REFERENCE TO RELATED APPLICATIONS

This application is related to application (ICR 7622-24) entitled "Method and Apparatus for Sensing Disturbance Using Fiber-Optic Polarization Rotation" and application (ICR 7626-27) entitled "Detecting Disturbance With Cross Polarized Fiber Optic Sensing", each of which is concurrently filed herewith.

BACKGROUND OF THE INVENTION

1. Field of the Invention

The invention relates to highly sensitive physical disturbance or vibration sensing by determining the effects of polarized light as affected by compression of an optical gap material, such sensing mechanism being susceptible of considerable miniaturization.

2. Description of the Prior Art

There are a number of prior teachings that relate to the use of optical fibers and interferometric techniques in determining the presence and character of vibrations and other non-harmonic movements. U.S. Pat. No. 4,368,645 discloses one form of optical pressure sensor that utilizes a material known as a photoelastic medium for effecting light changes. The index of refraction along x and y axes of the photoelastic medium will be different for forces applied to the axes and a relationship can be set up to determine the amount of difference in accordance with an applied pressure. The device utilizes circularly polarized light passing through a photoelastic medium, which light is then separated into two components for detection. In final analysis, two polarization components of light emerging from the photoelastic medium are individually measured and then processed to output a final determination that is related to pressure measurement. A related U.S. Pat. No. 4,321,831 in the name of Tomlinson et al. extends the teachings. That is, the device functions with linear polarized light and a birefringent plate to determine generally the applied pressure.

Another U.S. Pat. No. 4,556,791 teaches the use of an elasto-optic member affecting light as a function of an external stress to the elasto-optic member. This device divides light emanating from the elasto-optic material into orthogonal components aligned in bisection of the stress axis. The orthogonal components are photodetected with outputs applied to a difference amplifier, and the voltage difference is then related to the elasto-optic sensor. Finally, U.S. Pat. No. 4,518,857 discloses a device using an elasto-optic sensor that will provide output indication as to pressure while also compensating for temperature and pressure of operation. This device utilizes a pressure sensitive birefringent element which will cause fluctuations in light phase difference in response to applied pressure. Orthogonal components of polarized light are then processed to derive an output indication related to the differential phase shift established by the birefringent element.

U.S. Pat. No. 4,599,711 provides teaching of a fiberreflector gap in contact with a reflector 17 that is responsive to pressure variations, with the opposite side of the fiber-reflector gap connected to fiber optic cables, one transmitting and two of different size receiving light. Movement of the reflector element will then vary the area illumination of the different diameter receive fibers thereby to modulate the intensity of the received light. Finally, U.S. Pat. No. 4,642,458 teaches a polarimetric fiber sensor that consists of a birefringent optical fiber having the end silvered to provide reflection. Source light is continually reflected from the distal end reflector whereupon changes in the modal birefringence are monitored to detect changes in the physical parameter affecting the distal end, i.e., the reflecting end.

SUMMARY OF THE INVENTION

The present invention detects disturbance by monitoring the effects on an optical gap material, a selected optically clear material that alters light propagation therethrough in proportion to an external physical stress or force applied thereto. The gap material sensor may be employed with any of circularly polarized light or linearly polarized light systems for determining changes in phase or wavelength of the source light. When further processed, this data can yield frequency and amplitude of the physical disturbance or vibration. In particular, the invention teaches a much miniaturized fiber-optic sensor in the form of an optic fiber having a minute portion of optically clear flexible gap material deposited upon its distal end which is further coated with a polarization maintaining reflective coating. Such sensing optic fibers are quite versatile and may be used in robotic control to function as nerve endings for robot feel.

Therefore, it is an object of the present invention to provide a physical disturbance sensor of greatly miniaturized character.

It is also an object of the present invention to provide an optical sensor that may be employed variously with differing forms of light source and/or polarization.

It is still further an object of the present invention to provide an optical sensor that may be introduced into very remote and difficultly accessible places to provide an accurate sense indication of vibrational or other disturbance effects.

Finally, it is an object of the invention to provide a sensor system capable of detecting not only frequency but also amplitude of individual physical disturbances or movements.

Other objects and advantages of the invention will be evident from the following detailed description when read in conjunction with the accompanying drawings which illustrate the invention.

BRIEF DESCRIPTION OF THE DRAWINGS

FIG. 3 is a schematic diagram of an alternative form of optical sensor;

FIG. 4 is an alternative form of down-hole optical sensor such as may be employed for seismic signal detection;

FIG. 5 is a schematic diagram of alternative structure for use in down-hole sensing systems;

FIG. 6 is a schematic diagram of an alternative form of optical sensing system;

FIG. 7 is a schematic diagram of a selected alternative form of circuitry for providing light rotation handedness identification;

FIG. 8 is a schematic illustration of an optical sensor using a miniaturized optical gap/fiber sensor;

FIG. 9 is an enlarged view of the gap/fiber construction;

FIG. 10 is a schematic showing illustrating an electrically passive sensing device; and FIG. 11 is a schematic illustration of the fiber optic sensor as coupled to an earth surface for seismic wave pickup.

DETAILED DESCRIPTION OF THE INVENTION

Figure 1:
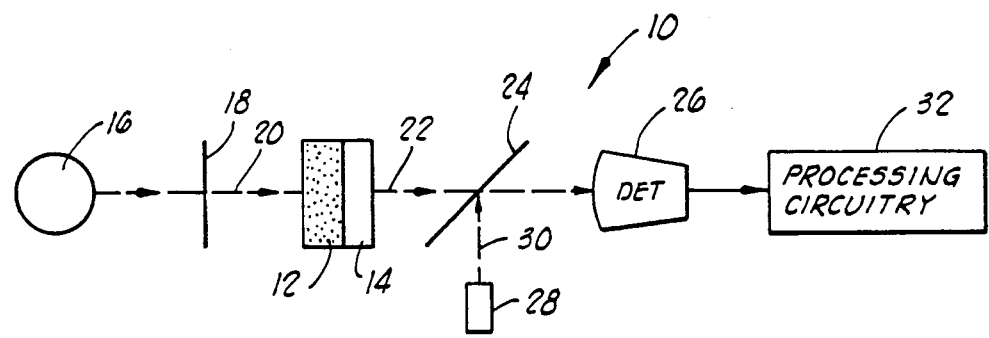
FIG. 1 is a schematic drawing of a first and basic form of optical sensing system.

Referring to FIG. 1, an optical sensor 10 utilizes a gap material 12 bonded to a suitable polarizer 14 as the optical sensor element. The gap material 12 may be any optically clear, flexible type of material that will provide the change in dimension or structure, however minute, that may then be optically differentiated and processed to provide proportionate signal output. In actual practice, a portion of quartz cut to the requisite physical dimensions provides very good operation since it is optically clear and it does have a flexibility or compressibility within the desirable range for optical detection at such very minute wavelengths.

A light source 16 may be selected which is a single frequency, coherent source whose output wavelength matches the center wavelength characteristic of an HNCP sheet 18. The HNCP sheet 18 is a commercially available item that converts the source light into single frequency, coherent, circularly polarized light waves at beam 20.

The circularly polarized light beam 20 is then directed perpendicularly through the gap material 12 sandwiched with light polarizer 14 whereupon it emerges in beam 22 for propagation through a beam splitter 24 to a photoelectric detector 26. A second or reference light source 28 also provides output of single-frequency, coherent, linearly polarized light in a beam 30 directed onto beam splitter 24 perpendicular to the beam 22 so that it reflects coincidentally with beam 22 onto the detector 26. Output from the photoelectric detector 26 is then applied through processing circuitry 32 wherein all the requisite computations can be made to determine amplitude and frequency of the disturbing vibration.

The flexible gap material 12 will cause phase change in the same way as a fiber coil when subjected to a pressure or force compressing the gap body. The output signal from detector 26 may be used to derive the time-averaged power which will be proportional to the instantaneous pressure on the gap material 12. The time averaged power may be determined as $$P_{TP} = a_z \frac{1}{\eta} [1 + \cos k_o \Delta Z(t)] \frac{watts}{m^2}$$

where $\eta^2 =$, the permeability over permittivity of the gap material, $$k_o = \frac{2\pi}{\lambda},$$

$\lambda =$ wavelength of light used, and $\Delta Z(t) =$ time rate of change in length of the gap material.

Equation (1) is the expression for time-averaged power at the detector 26, and full derivation of this relationship is developed in the copending U.S. application Ser. No. 351,147 (ICR 7622-24) entitled "METHOD AND APPARATUS FOR SENSING DISTURBANCE USING FIBER-OPTIC POLARIZATION ROTATION".

In operation, the circularly polarized light in beam 20 hits the gap material 12 and polarizer 14. Thus, the flexure of the gap material moves the polarizer 14 closer to or farther from the HNCP sheet 18, depending on the force being applied to the gap material 12. The reference light source 28 also provides output of single-frequency, coherent light but in this case it is linearly polarized light that is superimposed at the beam splitter 24 onto the beam 22. The light source 28 has the same angular frequency as the light source 16 such that the light source 28 is adjusted so that reflection of beam 30 from beam splitter 24 matches up the polarization axes of the two beams, i.e., they are coincident. In this way, the expression for received power (Equation (1)) is valid because the E-field vector from reference source 28 is parallel with the E-field vector passed by the polarizer 14. When an expression for the received power is derived in terms of $\Delta Z(t)$, and since the power is measurable, then the actual distance $\Delta Z(t)$ can be determined.

Figure 2:
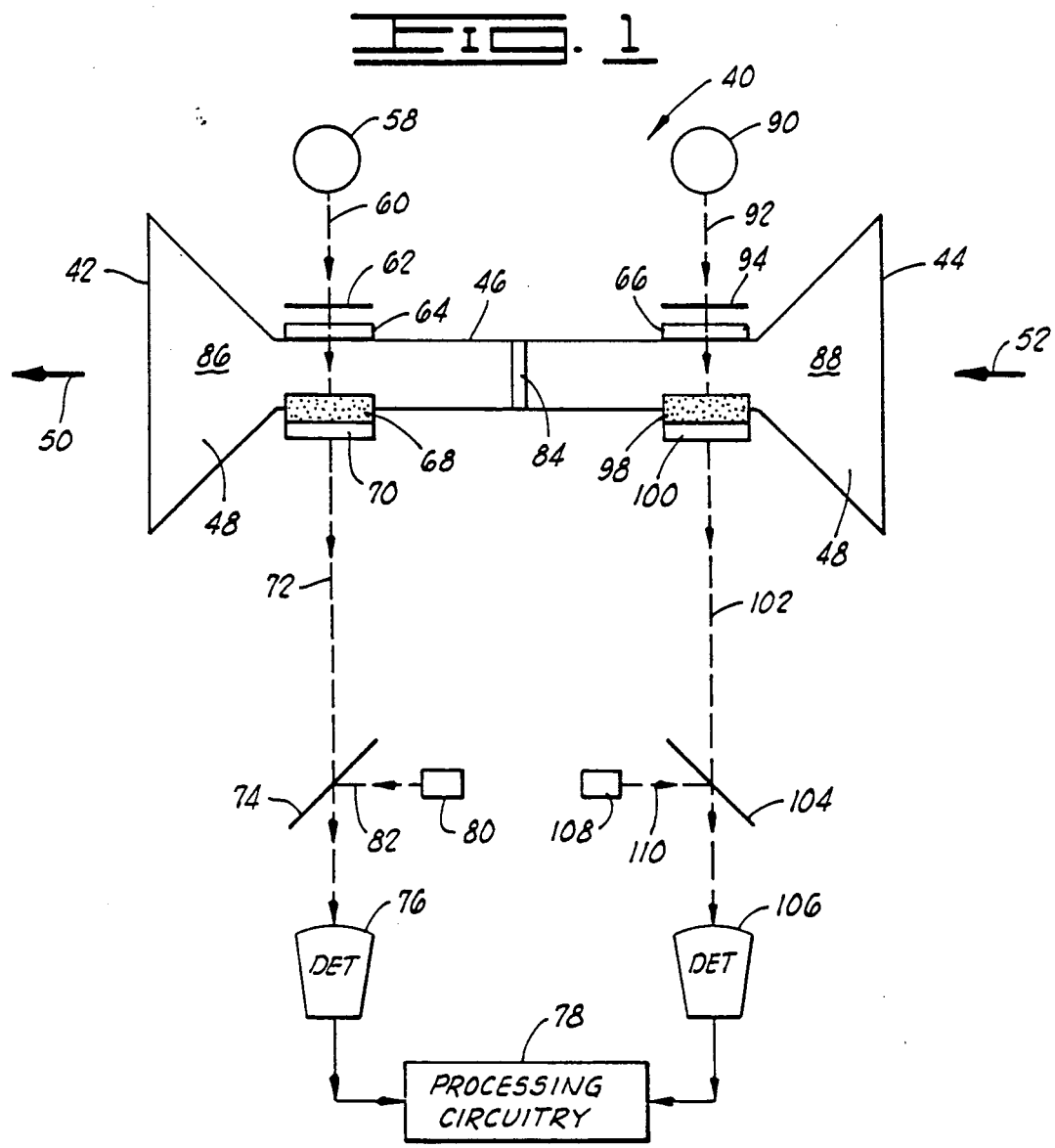
FIG. 2 is a schematic illustration of a double-ended optical sensor of a type that might be employed within a borehole for seismic signal detection.

FIG. 2 represents the schematic diagram of a sensor configuration that is suitable for measurement of shear waves in a borehole. The sensor 40 has two basic sensing elements consisting of diaphragms 42 and 44 covering opposite ends of a double horn enclosure 46 containing coupling fluid 48. The arrows 50 and 52 represent the instantaneous motion of the borehole fluid. Thus, with fluid motion as shown, the diaphragm 44 will cause an instantaneous pressure rise while the opposite side diaphragm 42 will indicate an instantaneous pressure decrease within the fluid 48.

The enclosure 46 is shown schematically but it may consist of any suitable enclosure having a generally regular form central volume suitable for providing opposite side windows 64 and 66 through which the optics is directed. Thus, the one side may consist of a light source 58, a single frequency coherent, linearly polarized light source (SFCLP), directing a beam 60 through an HNCP circular polarizer sheet 62 and suitable optically clear window 64 through the fluid 48. The opposite side of enclosure 46 is formed with a window formed by the optically clear gap material 68 sandwiched with a backing of polarizer coating 70 such that the circularly polarized light as affected by polarizer 70 proceeds on as beam 72 through a beam splitter 74 onto a detector 76. The photoelectric detector 76 then provides an output signal to the processing circuitry 78 whereupon the received power wave form from detector 76 can be digitized and stored for programmed processing. A reference light source 80, a single frequency, coherent, linearly polarized source (SFCLP), also projects a light beam 82 onto beam splitter 74 for superimposed reflection onto detector 76. In a normal or quiescent fluid condition the passage of the circularly polarized light beam 60 would have its E-field in alignment with the light passage of polarizer 70 as well as the linearly polarized light from reference source 80. The horn enclosure 46 includes a central sealing wall 84 which serves to maintain the pressure effects within the fluid 48 of opposite sides 86 and 88 independent of one another.

The remaining side of horn enclosure 46 conducts sensing in the same manner with an SFCLP light source 90 directing the beam 92 through an HNCP sheet 94 and window 96 through the neck portion of horn side 88. Flexible gap material 98 is disposed with its inner side responsive to pressure within enclosure 88 and an adjustable polarizer 100 is affixed closely thereon. Circularly polarized light from HNCP sheet 94 is affected by the change in thickness or $\Delta Z$ of gap material 98 and this light is further aligned with a linear polarizer 100 so that variations from alignment will indicate proportional changes in thickness of gap material 98. A beam 102 emitting from polarizer 100 is passed through a beam splitter 104 onto a detector 106 and, at the same time, a reference light source 108 (SFCLP) provides output beam 110 of single frequency, coherent, linearly polarized light for reflection from beam splitter 104 in alignment with the primary light beam 102 for projection onto the detector 106. Light variation signals from both of detector 76 and 106 are digitized and processed in processing circuitry 78.

In effect, the sensor 40 has two basic sensing elements, the one on the right side sensing a pressure rise while the left sensor indicates a pressure drop in response to the shear wave 50-52 movement within the drilling fluid. The processing circuitry 78 may employ what is commonly known as common mode rejection in passing the detected signals through a difference amplifier and that will serve to extract the shear wave signal to the exclusion of any others. This necessarily following because the shear wave at the right sensor will be 180° out of phase with the left sensor. In order to retrieve other signals that might be of interest, the outputs of the detectors 76 and 106 may be passed through a summing amplifier instead of a difference amplifier whereupon the shear wave signals would cancel while preserving other signals of possible interest.

FIG. 3 illustrates an alternative form of sensing device 120 similar to that device of FIG. 1 but utilizing a different reflection pattern. A light source 122 (SFCLP) projects a beam 124 through an HNCP plate 126 which directs a circularly polarized light beam 128 through a beam splitter 130 onto a gap material 132 that is physically positioned and suitably affixed to interface with a pressure disturbance thereby undergoing gap thickness changes. The flexible gap material 132 is bonded to a polarizer 134, i.e., laminated thereto in certain polarity orientation, and a reflective, polarization-maintaining coating 136 is further bonded to polarizer 134. Thus, light beam 128 directed through gap material 132 is polarized and reflected back to beam splitter 130 where it is directed via beam 138 onto a photoelectric detector 140. A reference light source 142 (SSCLP) also directs a beam of linearly polarized light at the same frequency as light source 122 along a beam 144 through beam splitter 130 in coincidence with beam 138 onto detector 140. Output signal from detector 140 proportional to illumination variation is then input to processing circuitry 146 for digitization and further processing to derive data indications related to the change in thickness ($\Delta Z$) of the gap material.

FIG. 4 illustrates how the reflective-coated gap material may be utilized in a seismic-type sensor within a borehole. A horn-type enclosure 150 is sealed by partition member 152 into opposite side enclosures 154, 156 that are fluid-filled as retained by respective sensor diaphragms 158 and 160. A pair of gap material blocks 162 and 164 bonded to respective reflective coated polarizers 166 and 168 are suitably bonded in the opposite side enclosures 154 and 156 in a position to sense fluid pressure changes affecting even minutely the dimensions of the gap material.

Respective light sources 170 and 172 (SFCLP) project light through HNCP sheets 174 and 176 and through respective beam splitters 178 and 180 onto the gap material blocks 162 and 164. Light passes through the gap blocks 162 and 164 and through respective polarizers 166 and 168 for reflection from reflector backing 182 and 184 whereupon the beam is reflected from respective beam splitters 178 and 180 onto detectors 186 and 188. Simultaneously, reference light sources 190 and 192, SFCLP light sources, also direct their respective light beams toward beam splitters 178 and 180 for transmission through and combination with the reflected beam portion from respective light sources 170 and 172 onto the detectors 186 and 188.

In operation, the diaphragms 158 and 160 are oriented so that they experience repetitive pressure increases and decreases thereby to transmit pressure variations within the fluid in enclosure 150. Thus, with the gap blocks 162 and 164 rigidly secured with the wall of enclosure 150, any flexures or index changes resulting from pressure increase or decrease will be apparent from the reflected polarized light from reflector backings 182 and 184, respectively. The affected reflected polarized light is then combined at beam splitters 178 and 180 with reference light from respective sources 190 and 192 for subsequent exposure on detectors 186 and 188. The detectors 186 and 188 then provide an output indication of the power wave form changes relative to each side of the sensor enclosure 150, and these wave form indications are then applied to processing circuitry 194 for digitization and further processing.

FIG. 5 illustrates yet another type of sensor configuration using the horn-type enclosure 200 having fluid 202 and diaphragm 204. In this case, the flexible gap material 206 is placed in a direct blocking position across enclosure 200 to experience a more direct pressure affecting influence from fluid 202. The gap material 206 is constructed in combination with a sandwich of optically clear polarizer material 208 having a reflective coating 210. This device depends to a greater extent upon miniaturization of the optics and the use of semi-conductor light source materials as are commercially available.

A primary light source 212 (SFCLP) may consist of a miniature semi-conductor type laser and a reference light source 214 may be a similar component. An HNCP sheet 216 is interposed across envelope 200 between light source 212 and gap material 206 and a beam splitter 218 is used for combined reflection of source 212 light from reflector surface 210 and the reference light from source 214 for projection of a combined beam 220 onto the face of a detector 222. Detector 222 would then derive a voltage indication of the power wave form of beam 220 to provide an output for subsequent processing via lead 224. In the event that a double-ended envelope be used it is merely necessary to duplicate the structure of FIG. 5 in a double-ended horn-type enclosure such as that discussed previously with respect to FIG. 4.

As a further alternative for selected applications, especially in the more miniaturized structures, a mirror 230 may be employed in place of a separate reference light source as shown in FIG. 6. Thus, a main light source 232 (SFCLP) provides a primary output beam 234 through a beam splitter 236 onto a block of gap material 238 having a reflective coating 240. The reflected beam is then directed back to the beam splitter 236 for reflection at a 90° angle onto a polarizer 242. Reference light from beam 234 is reflected at a right angle onto a quarter wave plate 244 for transmission therethrough and reflection at mirror 230 back through the quarter wave plate 244. Thus, the light receives a 180° phase change returning through plate 244 and is coincident with beam 234 as reflected from gap material 238 off of beam splitter 236 as a combined beam 246 onto polarizer 242. The detector 248 then senses the power waveform equivalent of light affectation as the result of gap material reaction in response to some external pressure.

FIG. 7 illustrates the beam 246 of FIG. 6 when a handedness detection is employed in order to define disturbance amplitude with greater precision. Thus, the combined light beam 246 from beam splitter 236, that is affected light from gap 238 and reflector coating 240 as well as the 180° displaced reference light from quarter wave plate 244, is directed upon a beam splitter 250 which separates the combined beam into a direct beam 252 and a beam 254 as reflected from a mirror 256. Beams 252 and 254 are then projected onto respective polarizers 258 and 260 as viewed by detectors 262 and 264 which derive signals indicative of the respective power wave forms. As previously described, the processing of the outputs of detectors 262 and 264 enable data processing whereby disturbance frequency and disturbance amplitude may be more accurately determined.

FIG. 8 illustrates yet another configuration that senses disturbance using interferometric technique. The configuration utilizes a single fiber optic cable sensor 270 which is capable of considerable miniaturization. Thus, the usual primary light source 272, reference light source 274 (or mirror combination), beam splitter 276 and lens 278 function with the cable sensor 270 to provide a combined interference beam and reference beam of light onto a power wave form detector 280. As shown in enlargement in FIG. 9, the cable sensor 270 consists of a single mode, polarization preserving optic fiber 282 having a gap material with polarization maintaining reflective coating 284 on the tip end thereof. An opaque sheathing material 286, a suitable plastic coating, then isolates the optical fiber and reflective coating 284. The reflective coating 284 may actually consist of a laminated sandwich of flexible gap material coated with a polarizer and then a polarization-maintaining reflective coating.

FIG. 10 illustrates a manner in which an electrically passive sensor device can be assembled using the gap material in combination with a length of fiber cable. Thus, a sensor assembly 290, an envelope type, containing a fluid 292 senses disturbance by means of pressure responsive diaphragm 294. Changes in fluid pressure within envelope 290 may then be sensed by a laminated sandwich 296 consisting of a selected gap material overlayed with suitable polarizer and reflector coating as optically coupled to the end of a single mode, polarization-preserving fiber cable 298. The fiber cable 298 may then extend for considerable distance to a suitable control or data processing position where suitable optics and electrical conversion circuitry can be placed for response to light variations in fiber cable 298. Thus, the cable 298 functions to channel light both to and from the sensor or laminated sandwich 296, i.e., source and data light.

Still another type of enclosure such as the enclosure of FIG. 11 can be employed on earth surface 302 to pick up $\bar{P}$ wave disturbances or other earth vibrations. In this case, the enclosure 300 contains a body of coupling fluid 304 and a suitable sealing diaphragm 306 for contact with the earth surface 302. The upper portion of envelope is placed in sealed relationship with a selected form of sensor device 308, e.g., such as the basic sensing element n FIG. 3, and any vibration or disturbance at earth surface 302 is transmitted through fluid 304 to sensor 308 whereupon detection and process circuitry can determine the nature and physical characteristics of the disturbance.

The foregoing discloses a novel sensor concept wherein any of many different types of optically clear gap material may be utilized to sense pressure differential for the purpose of so affecting applied light that very minute light path changes can be determined and rationally analyzed to derive physical parameters of the vibrations or other form of disturbance. Such gap material may also be used in minute quantities in combination with a fiber-optic cable to construct a miniaturized fiber-optic sensor that can be used to provide accessibility to remote or hard-to-reach positions whereupon reflected output from the fiber-optic cable can determine characteristics of the signal of interest using interferometric techniques. Thus, for example, one contemplated use for such miniaturized cable sensors is in robotic control to perform a function equivalent to nerve ending response in robot feel applications.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for sensing a physical disturbance, comprising:
    a block of gap material that is optically clear having parallel front and rear sides;
    means for positioning and securing said gap material for subjection to a physical disturbance;
    a polarizer with axis of polarity preoriented secured to the rear side of said block of gap material;
    a source of circularly polarized light projected through the gap material from the front side and through the polarizer to produce a source light beam;
    a beam splitter intercepting said source light beam;
    a linearly polarized reference light source projecting onto said beam splitter with axis of polarity prealigned to coincide with the polarizer axis of polarity when the combined source light beam and reference light source emerge from said beam splitter;
    a photoelectric detector generating an output indicative of time averaged power of the combined beam; and
    processing circuitry for analyzing the detector output and deriving the change in dimension of the gap material in response to the disturbance.

2. Apparatus as set forth in claim 2 wherein the source of circularly polarized light comprises:
    a single frequency, coherent source that produces light of selected output wavelength; and
    an HNCP sheet having a center wavelength equal to said output wavelength of the source, said HNCP sheet intercepting said produced light and converting to circularly polarized light.

3. Apparatus as set forth in claim 1 wherein said reference light source comprises:
a source of single frequency, coherent, linearly polarized light having said selected output wavelength.

4. Apparatus as set forth in claim 2 wherein said reference light source comprises:
a source of single frequency, coherent, linearly polarized light having said selected output wavelength.

5. Apparatus as set forth in claim 1 which is further characterized to include:
at least one envelope containing a coupling fluid and having at least one wall portion formed as a flexible diaphragm for positioning in contact with said physical disturbance; and
at least one means securing said gap material in contact with said coupling fluid.

6. Apparatus as set forth in claim 1 wherein said processing circuitry comprises:
means for determining the limits of change in time averaged power as detected at the photoelectric detector.

7. Apparatus as set forth in claim 5 wherein said processing circuitry comprises:
means for determining the limits of change in time averaged power as detected at the photoelectric detector.

8. Apparatus for sensing a physical disturbance, comprising:
a selected length of optic fiber of the single mode, polarization preserving type having a source end and a remote tip end placed in sensing disposition at said disturbance;
a gap material that is optically clear disposed on the tip end of the optic fiber;
a reflective coating placed on said gap with the reflective axis aligned perpendicular to the tip end of the optic fiber;
means directing a selected frequency of coherent, polarized source light into the source end of said optic fiber; and
means for receiving and analyzing reflected light from said source end of said optic fiber to determine any change in wavelength in response to change in index of said gap material.

9. Apparatus as set forth in claim 8 wherein:
said gap material is a cylindrical piece of quartz secured with axis aligned axially to said tip end.

10. Apparatus as set forth in claim 9 wherein:
said reflective coating is a silvered base surface of said cylindrical piece of quartz.

11. Apparatus as set forth in claim 8 wherein said means directing comprises:
a light source;
a beam splitter aligned at 45° to said light source; and
a lens receiving source light from the beam splitter for direction into said optic fiber.

12. Apparatus as set forth in claim 11 wherein said means for receiving and analyzing comprises:
a source of reference light of selected polarity directed through said beam splitter in alignment with reflected light from said optic
fiber as reflected by the beam splitter; photoelectric detector means receiving both the reference light and the reflected light to derive a signal indicative of time-averaged power; and
processing circuitry receiving said detector means signal for analysis to determine physical characteristics of said disturbance.

13. Apparatus as set forth in claim 12 wherein:
said gap material is a cylindrical piece of quartz secured with axis aligned axially to said tip end.

14. Apparatus as set forth in claim 13 wherein:
said reflective coating is a silvered base surface of said cylindrical piece of quartz.

* * * * *